US011316975B1

(12) United States Patent
Reeder

(10) Patent No.: US 11,316,975 B1
(45) Date of Patent: Apr. 26, 2022

(54) TECHNIQUES FOR MANAGING A 933 TEST CALL PERTAINING TO EMERGENCY SERVICES

(71) Applicant: Bandwidth, Inc., Raleigh, NC (US)

(72) Inventor: Larry Reeder, Denver, CO (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/552,761

(22) Filed: Dec. 16, 2021

(51) Int. Cl.
*H04M 3/00* (2006.01)
*H04M 3/51* (2006.01)
*H04M 3/22* (2006.01)
*G10L 13/00* (2006.01)
*H04L 67/02* (2022.01)
*H04L 65/10* (2022.01)

(52) U.S. Cl.
CPC .......... *H04M 3/5116* (2013.01); *G10L 13/00* (2013.01); *H04L 65/1006* (2013.01); *H04L 67/02* (2013.01); *H04M 3/22* (2013.01)

(58) Field of Classification Search
CPC ....... H04M 3/5116; H04M 3/22; G10L 13/00; H04L 65/1006; H04L 67/02
See application file for complete search history.

(56) References Cited

U.S. PATENT DOCUMENTS

| 9,438,729 | B2* | 9/2016 | Natesan | H04M 3/4936 |
| 10,791,221 | B1* | 9/2020 | Vislocky | H04M 3/5116 |
| 2009/0268713 | A1* | 10/2009 | Ottur | H04L 43/00 370/352 |
| 2012/0090028 | A1* | 4/2012 | Lapsley | H04L 63/1416 704/E21.001 |
| 2012/0314699 | A1* | 12/2012 | Qiu | H04M 7/006 370/352 |
| 2018/0310159 | A1* | 10/2018 | Katz | H04M 3/5116 |
| 2021/0204108 | A1* | 7/2021 | Horelik | H04W 4/90 |
| 2021/0314437 | A1* | 10/2021 | Nixon | H04L 65/80 |

* cited by examiner

*Primary Examiner* — Khai M Nguyen
(74) *Attorney, Agent, or Firm* — Gregory Stephens

(57) ABSTRACT

Techniques for customizing an audio response to emergency test calls are provided. The technique includes receiving a Voice over Internet Protocol (VoIP) emergency test call from a test call device by an emergency service (ES) provider. Call information specific to the VoIP emergency test call is obtained from an ES provider customer database associated with the ES provider. The obtained call information specific to the VoIP emergency test call is provided to an emergency test call audio generation server. A customized audio response to the VoIP emergency test call is generated and returned to the test call device based on the provided call information specific to the VoIP emergency test call using text-to-speech technology.

12 Claims, 8 Drawing Sheets

500

100

Standard 911 Call

200

933 Call

500

700

TECHNIQUES FOR MANAGING A 933 TEST CALL PERTAINING TO EMERGENCY SERVICES

TECHNICAL FIELD

Examples described herein are generally related to techniques for processing 933 test calls to validate emergency service for end user subscribers.

BACKGROUND

Emergency calling or 911 as it is known in the United States is a mandated and regulated aspect of telecommunications. End users of interconnected VoIP telephone networks must be able to dial 911 and be connected with a public safety answering point (PSAP) that is the most convenient based on the location of the caller. Emergency service (ES) providers handle 911 calls in a different manner than normal outbound calls. For instance, location data must be determined and used so as to be able to direct the call to the proper PSAP.

Most VoIP telephone systems keep records of the locations of each endpoint such that when a 911 call is made, the caller's location may be determined and embedded into the signaling of the call thereby allowing the ES provider to route the call to the proper PSAP and present the PSAP with, among other data points, the location data of the caller.

When telephony service customers obtain 911 service from an ES provider, the location of each of the endpoints is typically entered into a database used by the ES provider to route the call when it receives a 911 call from a particular endpoint. In the early days of interconnected VoIP 911, the only way to test the service was for each endpoint to make an actual 911 call and determine if the call routing was accurate. This process, however, is extremely time consuming, resource intensive, and occupies the PSAPs with call traffic that is not based on actual emergencies.

One ES provider, Bandwidth, Inc., devised a test scheme that did not require the endpoints being tested to make an actual 911 call. Rather, a 933 calling number was established that allowed the endpoints to make a test call and determine the information that would be used to route the call had it been an actual 911 call. This process verified various data points, for example, location, calling number, intended PSAP, and the like without having to encumber actual 911 resources. In addition, the 933 test scheme could be controlled to make a batch of calls for larger scale testing further enhancing the efficiency of the service. This original 933 test scheme was wholly implemented by the ES provider meaning that customers were constrained by the implementation of the ES provider and the data they made available to the customer. If the customer wanted specific data for a 933 test call or a particular audio message to be played back during the test call, they were dependent on the ES provider configuring the system to their liking. This level of customized configuration does not make sense for the ES provider as they would need to customize each instance of the 933 test call for each customer. Accordingly, there is a need for allowing an ES provider to provide the raw data for a 933 test call to the customer's telephony server(s) or to an alternate telephony server that can be customized to respond to a 933 test call in a desired manner.

SUMMARY

Some embodiments of the present inventive concept provide methods for customizing an audio response to emergency test calls. The method includes receiving a Voice over Internet Protocol (VoIP) emergency test call from a test caller by an emergency service (ES) provider. Call information specific to the VoIP emergency test call is obtained from an ES provider customer database associated with the ES provider. The obtained call information specific to the VoIP emergency test call is provided to an emergency test call audio generation server. A customized audio response to the VoIP emergency test call is generated based on the provided call information specific to the VoIP emergency test call using text-to-speech technology.

Related computer and non-transitory medium claims are also provided.

DETAILED DESCRIPTION

Figure 1:
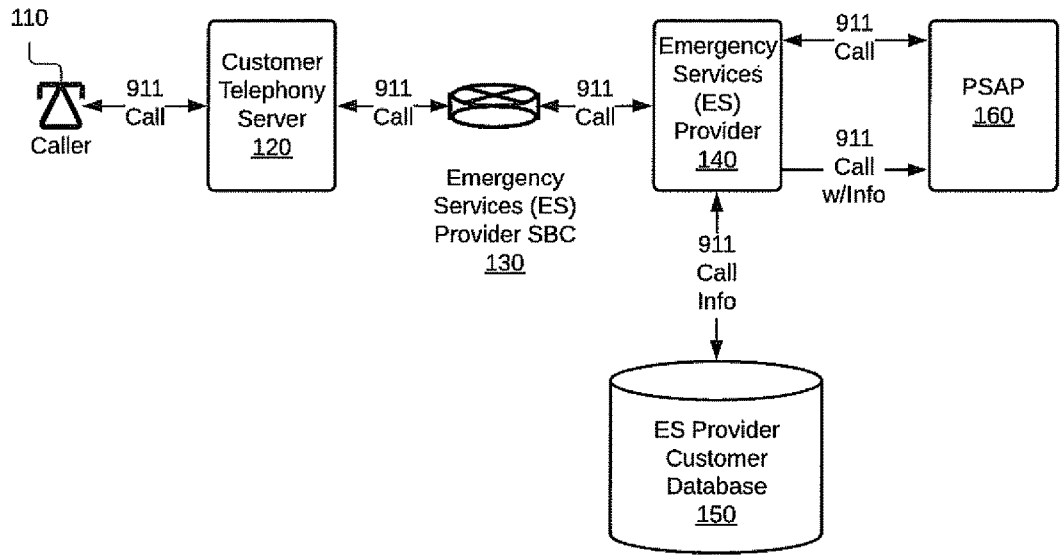
FIG. 1 is a block diagram illustrating a prior art example of an interconnected VoIP 911 call.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, 933 test schemes as they currently exist are wholly implemented by the ES provider meaning that customers are constrained by the implementation of the ES provider and the data the ES provider makes available to the customer. Thus, a customer is limited by the generic offerings of the ES provider. For example, if the customer wanted specific data for a 933 test call or a particular audio message to be played back during the test call, this could generally not be accommodated as this level of customized configuration does not make sense for the ES provider as they would need to customize each instance of the 933 test call for each customer. Accordingly, some embodiments of the present inventive concept provide methods, systems and computer program products that allow the ES provider to provide the raw data for a 933 test call to the customer's telephony server(s) or to an alternate telephony server that can be customized to respond to a 933 test call in a desired manner.

As will be discussed further below with respect to the figures, various embodiments of the present inventive concept include systems, methods, apparatus, and/or computer program products that describe and claim techniques to manage a 933 test call from an end user subscriber to an ES provider.

Referring first to FIG. 1, a block diagram illustrating a conventional VoIP network architecture 100 for making a standard 911 emergency call on an inter-connected VoIP network will be discussed. As illustrated in FIG. 1, the VoIP network architecture 100 includes a customer telephony server 120, an emergency services provider session border controller (SBC) 130, an emergency services provider (ES) 140, an ES provider customer database 150 and a public safety answering point (PSAP) 160. It will be understood that the VoIP network architecture 100 in FIG. 1 is provided as example only. FIG. 1 is not intended to include all elements of a system, but includes only those elements necessary for discussion.

The VoIP network may be provided by a group of technologies and is a method for the delivery of voice communications and multimedia sessions over Internet Protocol (IP) networks, such as the Internet. The terms Internet telephony, broadband telephony, and broadband phone service specifically refer to the provisioning of communications services (voice, facsimile, short message service (SMS), voice-messaging and the like) over the Internet, rather than via the public switched telephone network (PSTN). The PSTN network is an aggregate of the world's circuit-switched telephone networks that are operated by national, regional, or local telephone operators, providing infrastructure and services for public telecommunication. The network discussed herein may be any combination of wired and/or wireless networks, including without limitation a direct interconnection, secured custom connection, private network (e.g., an enterprise intranet), public network (e.g., the Internet), personal area network (PAN), local area network (LAN), metropolitan area network (MAN), operating missions as nodes on the Internet (OMNI), wireless area network (WAN), wireless network (e.g., 802.11 WiFi), cellular network, and other communications networks.

Referring again to FIG. 1, operations of a conventional 911 call will be discussed. As illustrated, a caller initiates a 911 call from an end user device 110. As used herein, the end user device 110 can be any end user device capable of making a 911 call, for example, the end user device 110 can be a personal computer (PC), a mobile device such as smartphone, laptop, VoIP phone, IoT device, or another telephonic device. The 911 call is routed from the end user device 110 to the customer telephony server 120, which passes the 911 call to the ES SBC 130. An SBC provides interconnection between incompatible signaling messages and media flows (sessions) from end devices or application servers. SBCs are generally used in enterprise infrastructures or any carrier network delivering commercial residential, business, fixed-line or mobile VoIP services. They are typically deployed at both the network edge and at carrier interconnects, the demarcation points (borders) between their users and other service providers. The ES provider SBC 130 provides a connection from the customers telephony server 120 to the ES provider 140. The ES provider communicates the 911 call with the PSAP 160. The public safety answering point (PSAP), sometimes called "public-safety access point," is a call center where emergency calls initiated by any mobile or landline subscriber are terminated. In other words, the PSAP 160 is the destination for the 911 call. As further illustrated, the ES provider 140 has access to an ES provider customer database 150, which contains information relevant to providing the proper response to the 911 call.

Figure 2:
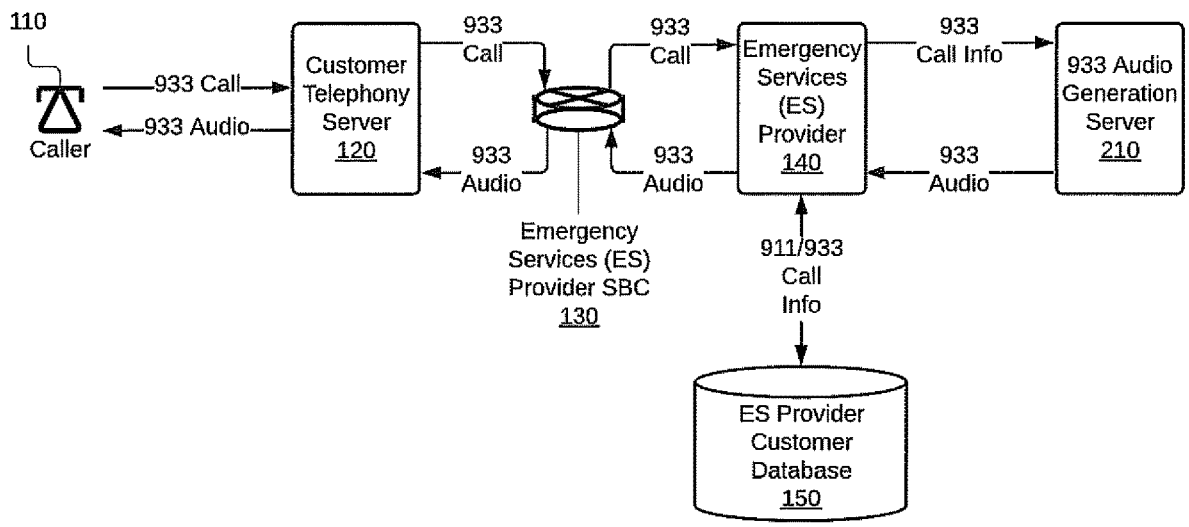
FIG. 2 is a block diagram illustrating a prior art example of an interconnected VoIP 933 test call.

Referring now to FIG. 2, a block diagram illustrating a conventional VoIP network architecture 200 for making a 933 emergency test call on an inter-connected VoIP network will be discussed. The VoIP network architecture 200 includes the same or similar customer telephony server 120, emergency services (ES) provider session border controller (SBC) 130, emergency services provider (ES) 140 and ES provider customer database 150 as discussed with respect to FIG. 1, but further includes a 933 audio generation server 210 instead of the PSAP 160 of FIG. 1. It will be understood that the VoIP network architecture 200 in FIG. 2 is provided as example only and, therefore embodiments of the present inventive concept are not limited thereto. Thus, the test 911 call—the 933 call—never actually makes contact with a PSAP, but is a test call that is responded to with a message indicating whether the test was successful.

In particular, operations of a conventional 933 call will now be discussed with respect to FIG. 2. A caller makes a 933 call from an end user device 110. The 933 call is routed from the end user device 110 to the customer telephony server 120, which passes the 933 call to the ES provider SBC 130. The ES provider 140 communicates the 933 call with the 933 audio generation server 210, which then generates the appropriate response to the 933 call and sends the response to the 933 call back to the caller through the various elements of the system as illustrated in FIG. 2. Similar to the 911 call of FIG. 1, the ES provider 140 has access to an ES provider customer database 150, which may contain information relevant to providing the proper response to the 933 call.

As discussed above, the response generated by the 933 audio generation server 210 is not particular to the customer. It is a generic response indicating the success/failure of the 933 call and any other relevant information. Customers have a need for more detailed and customized responses from the 933 Server. For example, some customers would like the audio response to repeat the calling number twice; play the name of the PSAP the call would be routed to if it were an actual 911 call; include the first four digits of a latitude/longitude location; if the calling number doesn't have a valid address and that is what is intended, the audio message would not tell the subscriber there is something wrong with the service; and the like. However, customizing the audio response to a 933 call to the specific requests of each customer would be costly and burdensome. Accordingly, some embodiments of the present inventive concept provide techniques for allowing customers to generate a unique message responsive to a 933 call as will be discussed with respect to FIGS. 3 through 8 below.

Figure 3:
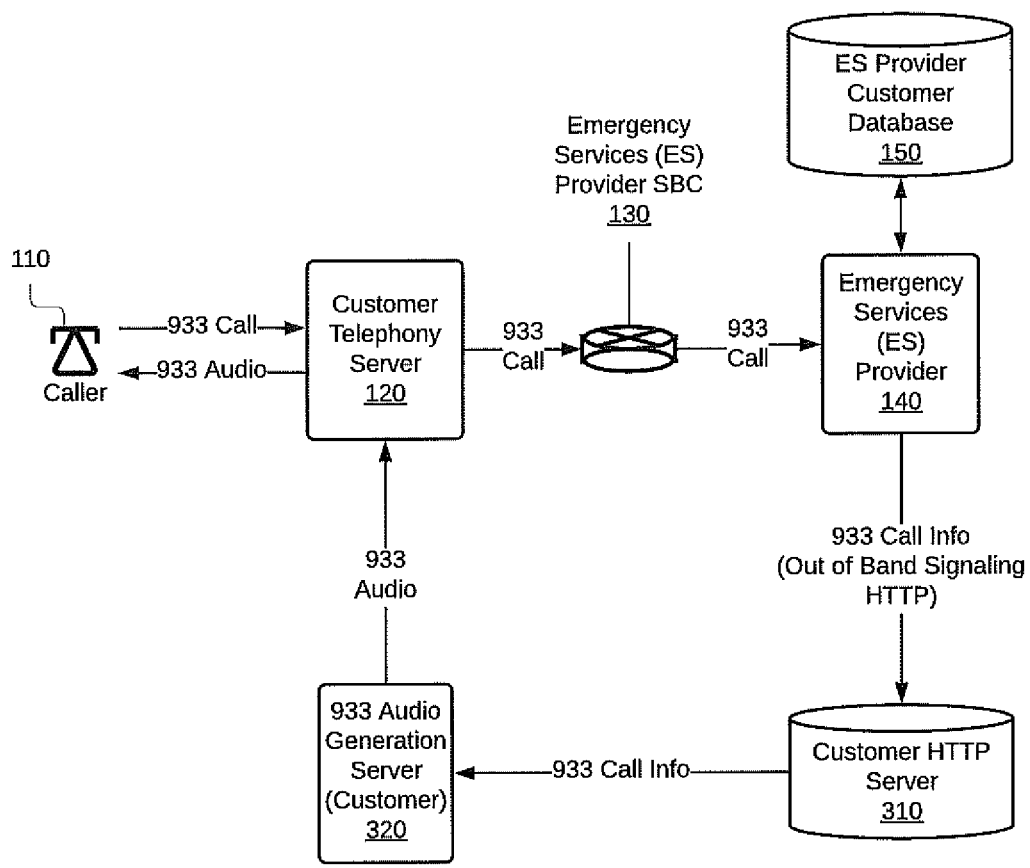
FIG. 3 is a block diagram illustrating an example of a VoIP 933 test call in which the customer of the ES provider configures the output of the 933 test call according to some embodiments of the present inventive concept.

Referring first to FIG. 3, a block diagram illustrating an example VoIP network architecture 300 for making a 933 emergency test call on an inter-connected VoIP network according to some embodiments of the present inventive concept will be discussed. As illustrated, the VoIP network architecture 300 includes the same or similar customer telephony server 120, emergency services (ES) provider session border controller (SBC) 130, emergency services provider (ES) 140 and ES provider customer database 150 as discussed with respect to FIG. 1, but further includes a customer hypertext transfer protocol (HTTP) server 310 and a 933 audio generation server 320. It will be understood that the VoIP network architecture 300 in FIG. 3 is provided as example only and, therefore embodiments of the present inventive concept are not limited thereto.

Thus, in embodiments illustrated in FIG. 3, the 933 call from the caller at the end user device 110 is routed through the customer telephony server 120, the ES provider SBC 130 and the ES provider 140 to a customer HTTP server 310. In particular, a "look up" is performed to obtain call information ("call info") and this information ("call info") is sent to the customer HTTP server 310 "out of band." As used herein, "out of band" refers to sending information outside of the session initiation protocol (SIP) signaling of the actual 933 test call over an HTTP signaling path to the customer, thus putting less burden on the system.

The customer HTTP server 310 sends the "call info" to the 933 audio generation server 320 associated with the customer. The 933 audio generation server 320 generates a customized audio response to the 933 call from the "call info" using, for example, text to speech (TTS) technology. Once generated, the customized audio response is sent from the audio generation server 320 back to the customer telephony server 120 which then plays the customized audio response back to the caller on the end user device 110. Although embodiments of the present inventive concept discuss using TTS to generate the customized audio response, other technologies may be used to generate the response from the "call info" without departing from the scope of the present inventive concept.

Thus, by customizing the "call info" a customer has more freedom to control the information provided to a 933 caller responsive to the 933 call. Using the TTS technology to generate the customized audio response provides highly efficient user customization.

It will be understood the functions of the ES provider 140 having access to the ES provider customer database 150 may be provided by any ES provider without departing from the scope of the present inventive concept. One such ES provider is Bandwidth, Inc.

Figure 4:
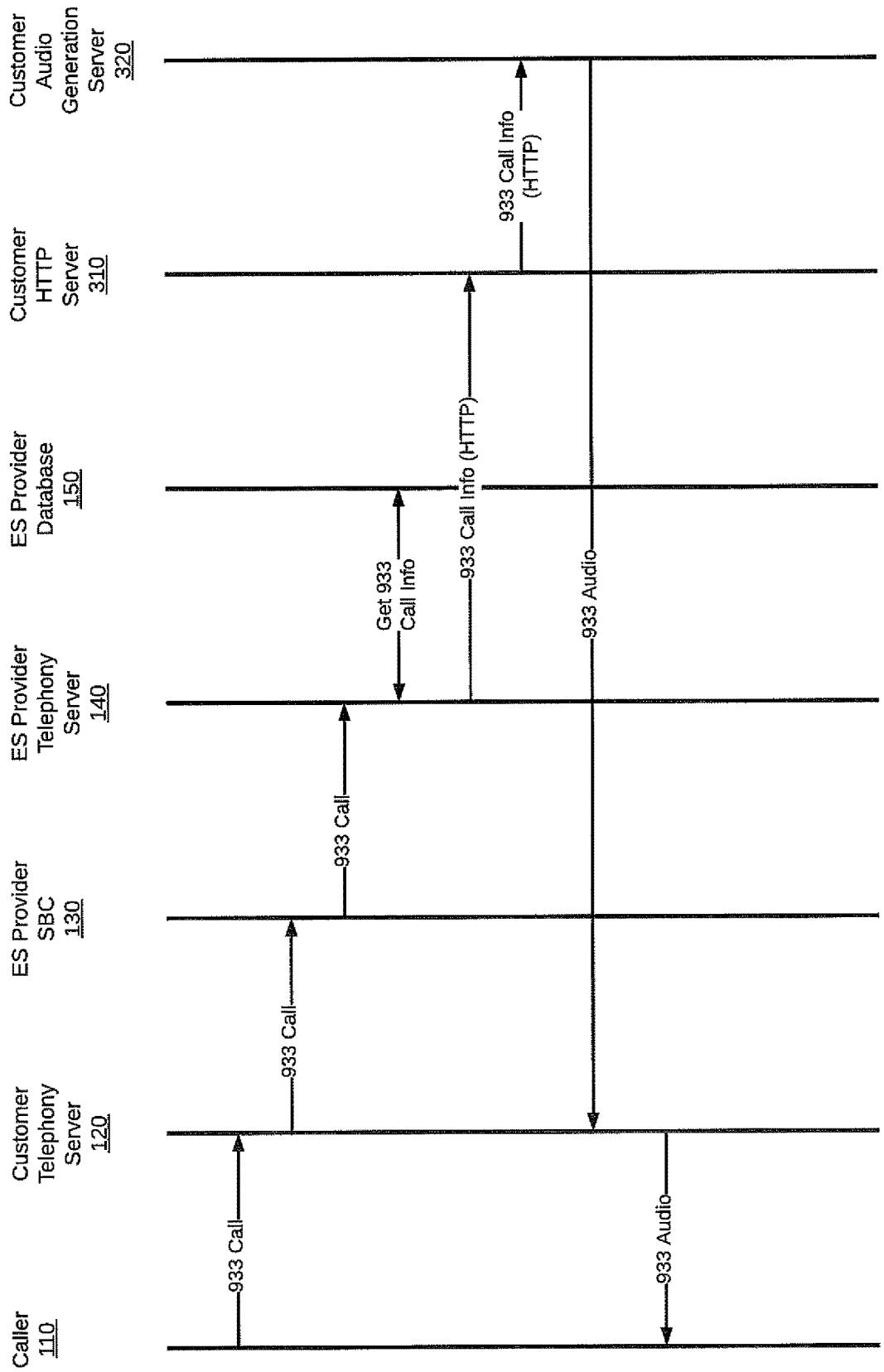
FIG. 4 is a diagram illustrating a data flow of the embodiments illustrated in FIG. 3.

Operations of embodiments illustrated in FIG. 3 are illustrated clearly in the flow diagram of FIG. 4. FIG. 4 illustrates a data flow diagram 400 for making a VoIP based 933 telephone call in accordance with FIG. 3. This data flow may be representative of some or all of the operations executed by one or more logic, features, or devices described herein, such as any devices or systems described above with references to other figures herein. In the illustrated examples shown in FIG. 4, the data flow 400 may comprise one or more steps or processes involved in allocating and managing resources in a communications network as described elsewhere herein. The embodiments, however, are not limited to the number, type, order or arrangement of steps shown in FIG. 4.

As illustrated in FIG. 4, the caller 110 makes a 933 call and the 933 call is routed through the customer telephony server 120 and the ES Provider SBC 130 to the ES Provider telephony server 140. The ES provider telephony server 140 obtains the call information ("call info") from the ES provider customer database 150 and the call information is sent out of band to the customer HTTP server 310. The call information is forwarded to the customer audio generation server 320 and a customized audio response is generated from the call information using TTS technology. The customized audio response is sent back to the customer telephony server 120 and is communicated to the caller 110. Thus, customers can use the programmable voice service to put together a customized audio response to the 933 call including the information they want their subscribers to hear.

Figure 5:
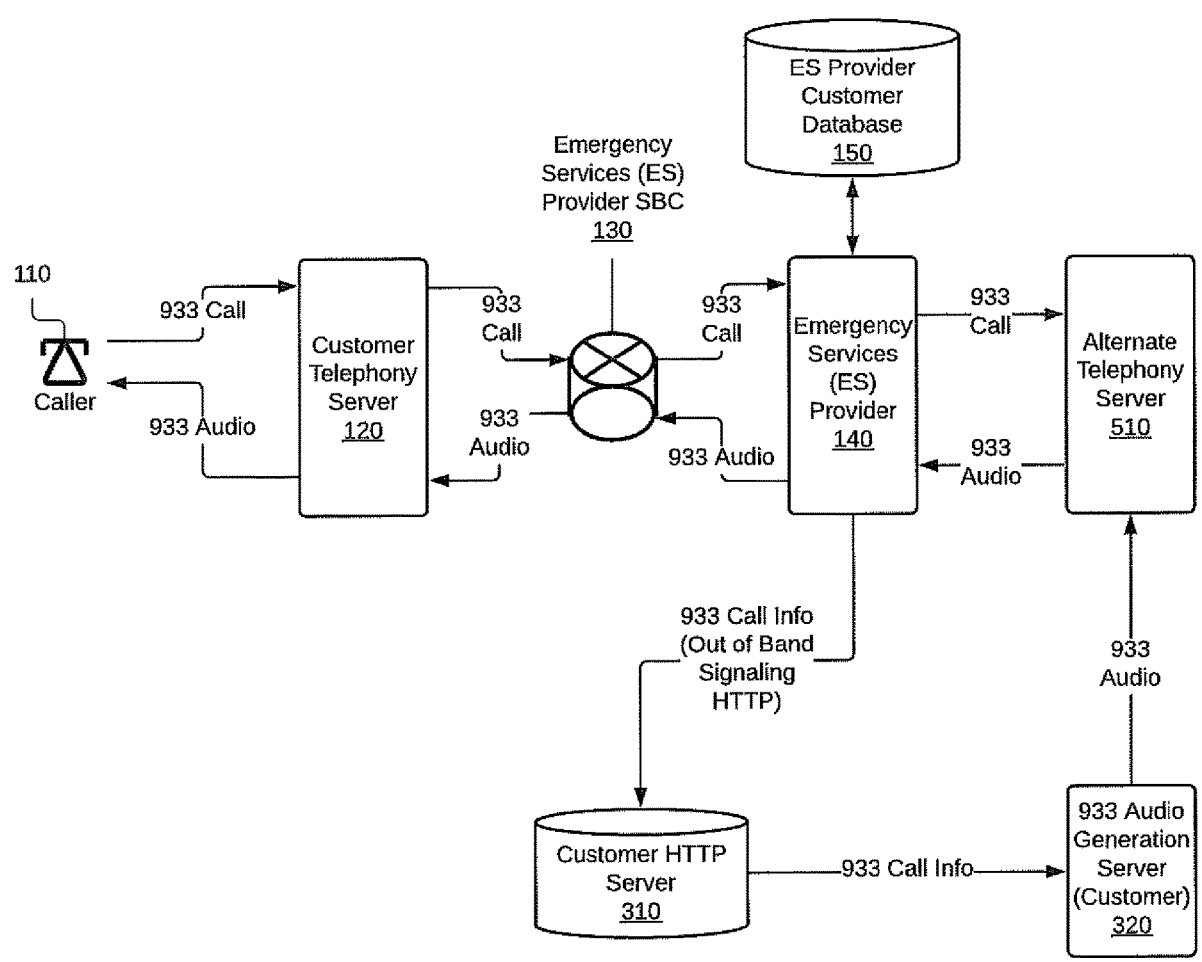
FIG. 5 is a diagram illustrating an example of a VoIP 933 test call in which the customer of the ES provider configures the output of the 933 test call according to some embodiments of the present inventive concept.

Referring now to FIG. 5, a block diagram illustrating an example VoIP network architecture 500 for making a 933 emergency test call on an inter-connected VoIP network according to some embodiments of the present inventive concept will be discussed. As illustrated in FIG. 5, the VoIP network architecture 500 includes the same or similar customer telephony server 120, emergency services (ES) provider session border controller (SBC) 130, emergency services provider (ES) 140, ES provider customer database 150, a customer HTTP server 310 and a 933 audio generation server 320 as discussed with respect to FIG. 3, but further includes an alternate telephony server 510, separate from the customer telephony server 120. It will be understood that the VoIP network architecture 500 in FIG. 5 is provided as example only and, therefore embodiments of the present inventive concept are not limited thereto.

Thus, in embodiments illustrated in FIG. 5, the 933 call from the caller at the end user device 110 is routed through the customer telephony server 120 and the ES provider SBC 130 and the ES provider 140 sends the 933 call to the alternate telephony server 510 and the "call info" to the customer HTTP server 310. In particular, a "look up" is performed to obtain call information ("call info") and this information ("call info") is sent to the customer HTTP server 310 "out of band." The customer HTTP server 310 sends the "call info" to the 933 audio generation server 320 associated with the customer. The 933 audio generation server 320 generates a customized audio response to the 933 call from the "call info" using, for example, text to speech (TTS) technology. Once generated, the customized audio response is sent from the audio generation server 320 to the alternate telephony server 510, which sends the customized audio response back to the caller using the end user device 110.

In other words, the 933 test call is forwarded from the ES provider 140 to the alternate telephony server 510 while also performing the look up to get the "call info" to send to the customer HTTP server 310 where it is used by a 933 audio generation server 320 to develop a customized audio response. In embodiments illustrated in FIG. 5, the 933 audio generation server 320 sends the customized audio response to the 933 call to the alternate telephony server 510 that is responsible for sending it back to the caller.

As used herein, the "alternate telephony server" refers to a server that is not the original customer server that initially handled the 933 call. In some embodiments, it could be a secondary customer server reserved for managing 933 calls, a server provided by the ES provider, for example, Bandwidth, a Twilio server, or the like without departing from the scope of the present inventive concept. It will be understood that the alternate server does not imply that the server is controlled by a third party, as the alternate server could be controlled by the customer. For example, a customer could reserve specific components in their network for managing test 933 calls.

Figure 6:
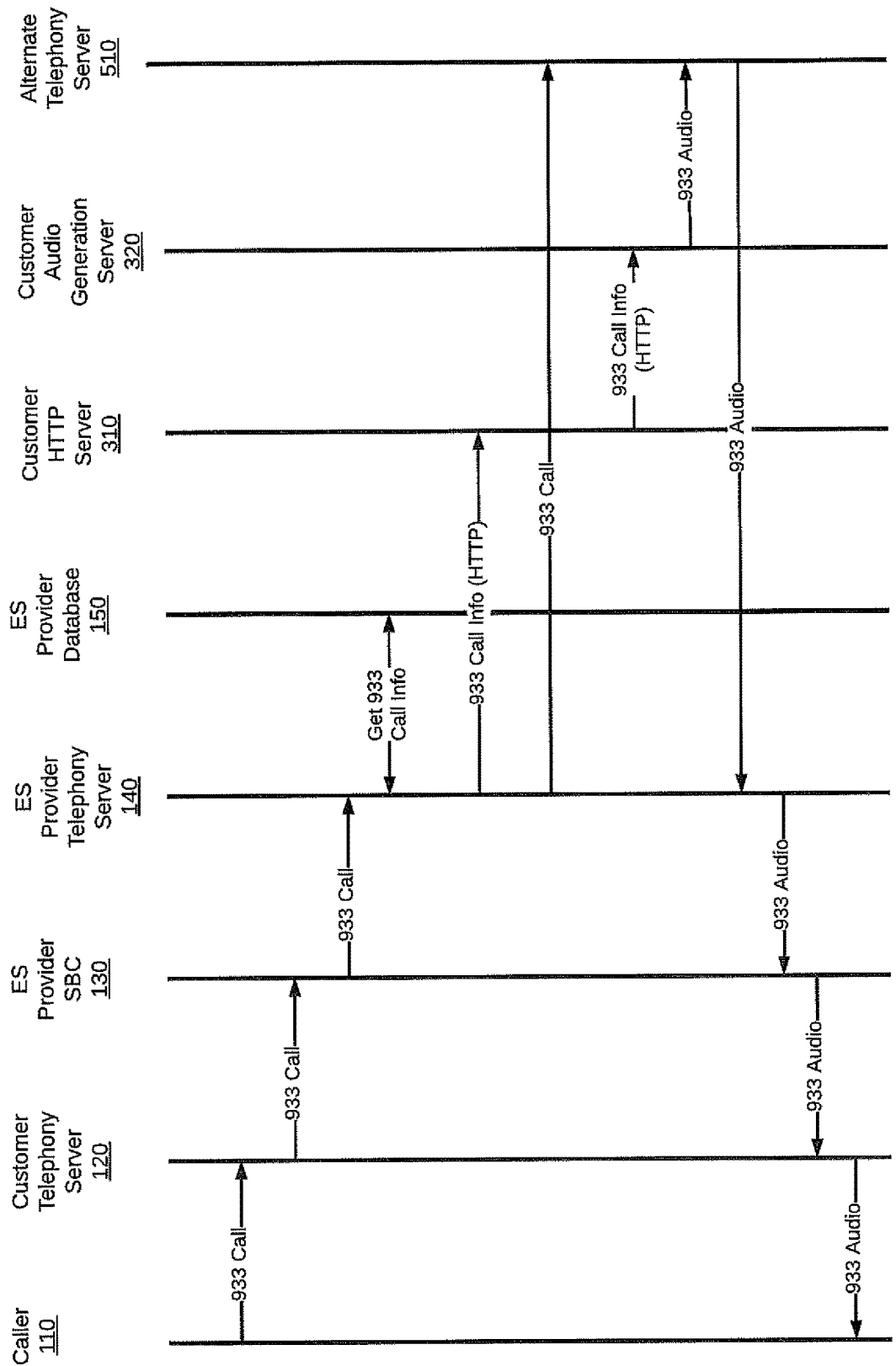
FIG. 6 is a diagram illustrating a data flow of the embodiments illustrated in FIG. 5.

Referring now to FIG. 6, a data flow diagram 600 for making a VoIP based 933 telephone call according to embodiments illustrated in FIG. 5 will be discussed. This data flow may be representative of some or all of the operations executed by one or more logic, features, or devices described herein, such as any devices or systems described above with references to other figures herein. In the illustrated examples shown in FIG. 6, the data flow 600 may comprise one or more steps or processes involved in allocating and managing resources in a communications network as described elsewhere herein. The embodiments, however, are not limited to the number, type, order or arrangement of steps shown in FIG. 6.

As illustrated in FIG. 6, the caller 110 initiates the 933 test call and the call is routed through the customer telephony server 120 and the ES provider SBC 130 to the ES provider telephony server 140. The ES provider telephony server 140 sends the test 933 call to the alternate telephony server 510 and sends the "call info" to the customer HTTP server 310 out of band. The "call info" is sent to the audio generation server 320 where the call information is turned into a customized audio response using TTS technology. The customized audio response is then provided from the audio generation server 320 to the alternate telephony server 510, which then provides the customized audio response back to the caller 110.

Figure 7:
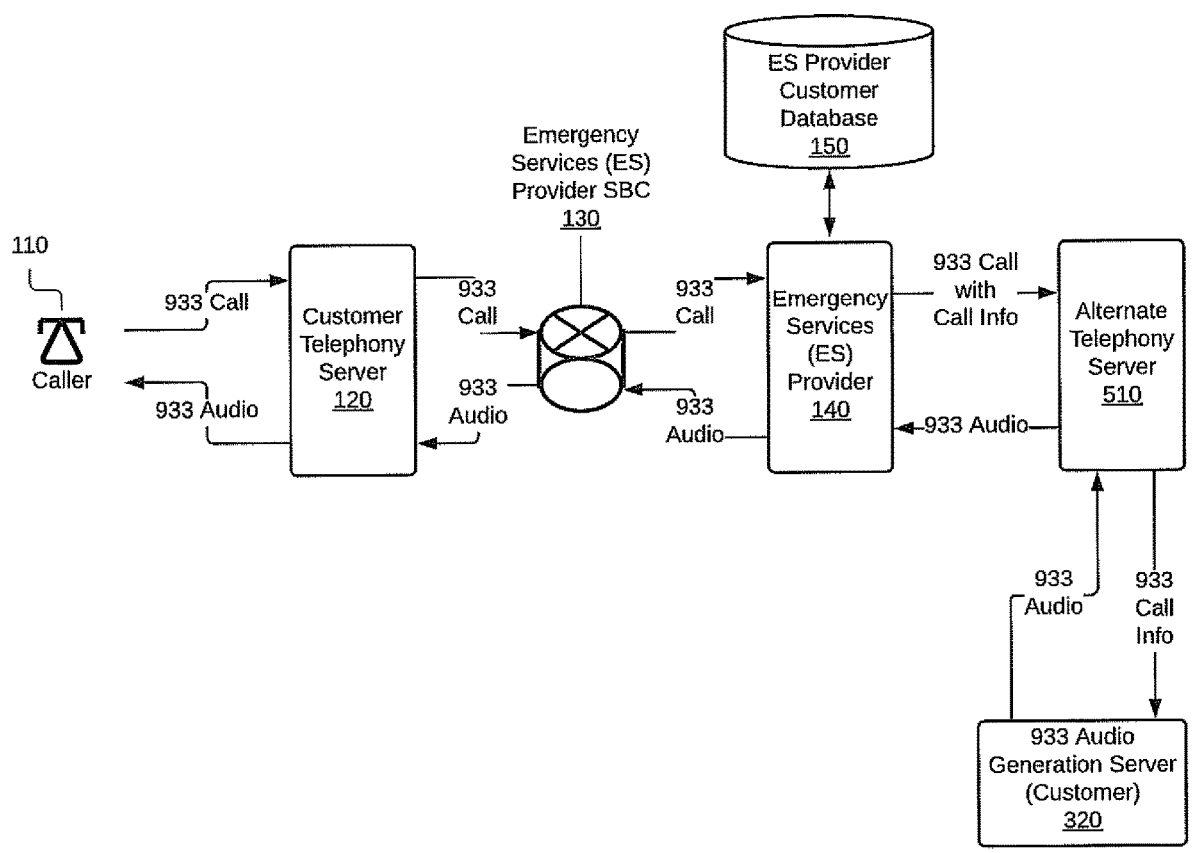
FIG. 7 a block diagram illustrating an example of a VoIP 933 test call in which the customer of the ES provider configures the output of the 933 test call according to some embodiments of the present inventive concept.

Referring now to FIG. 7, an example VoIP network architecture 700 for making a 933 emergency test call on an inter-connected VoIP network according to some embodiments of the present invention. As illustrated in FIG. 7, the VoIP network architecture 700 includes the same or similar customer telephony server 120, emergency services (ES) provider session border controller (SBC) 130, emergency services provider (ES) 140, ES provider customer database 150, 933 audio generation server 320 and alternate telephony server 510 as discussed with respect to FIG. 5, but does not include a Customer HTTP Server 310. It will be understood that the VoIP network architecture 700 in FIG. 7 is provided as an example only and, therefore embodiments of the present inventive concept are not limited thereto.

Thus, in embodiments illustrated in FIG. 7, the 933 call from the caller at the end user device 110 is routed through the customer telephony server 120 and the ES provider SBC 130 and the ES provider 140 sends the 933 call to the alternate telephony server 510, but does not send anything to a customer HTTP server out of band. The ES provider 140 looks up the "call info" in the ES provider customer database 150 and forwards the 933 test call with the call info (in band) to the alternate telephony server 510 in band, i.e. within the standard session initiation protocol (SIP) signaling of the 933 test call. The alternate telephony server 510 forwards just the "call info" to the customer's 933 audio generation server 320 to develop the customized audio response. The 933 audio generation server 320 sends the customized audio response back to the alternate telephony server 510 and the alternate telephony server 510 is responsible for sending the customized audio response back to the caller. Thus, in embodiments illustrated in FIG. 7, the "call info" is sent in band (i.e., within the SIP signaling) from the ES provider 140 to the alternate telephony server.

Figure 8:
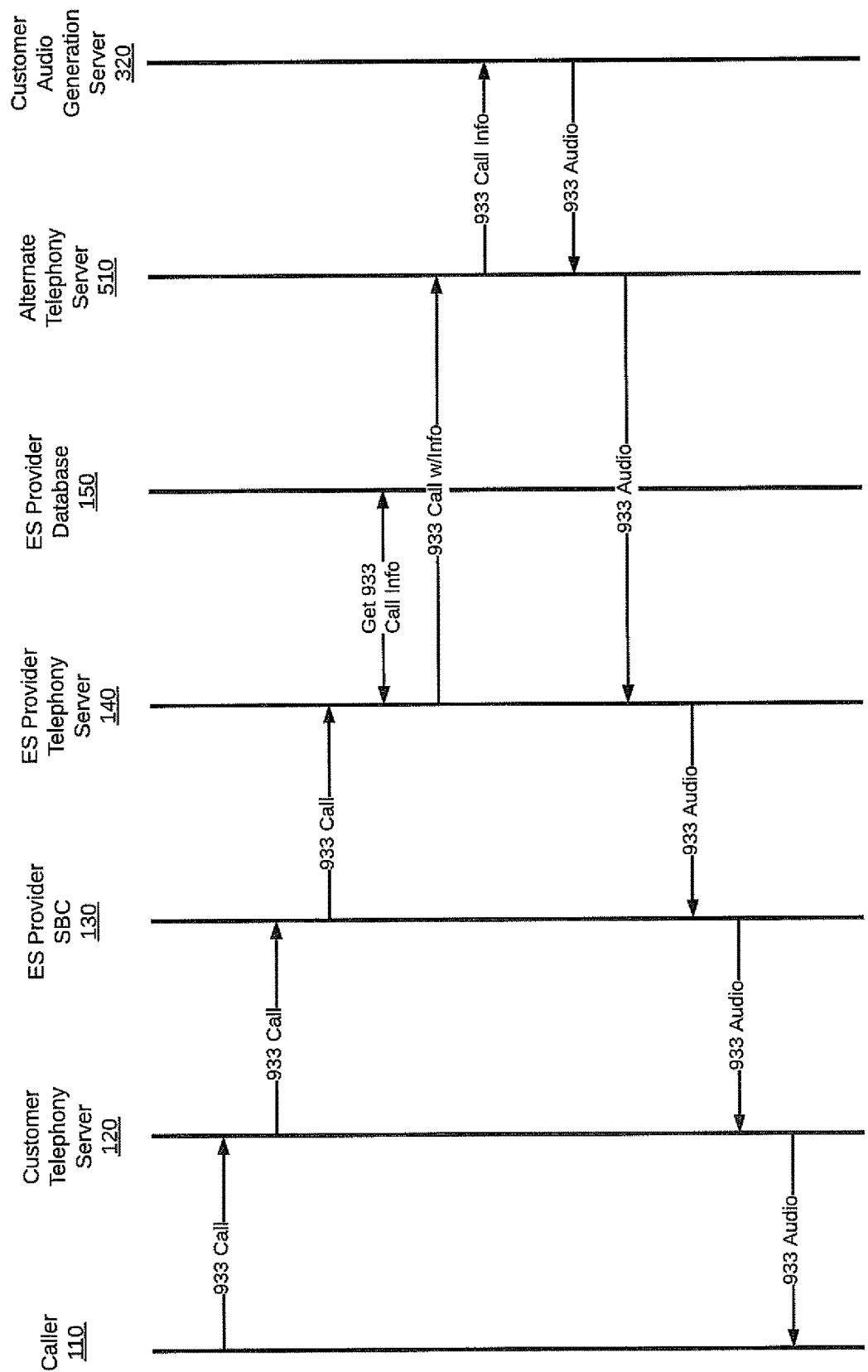
FIG. 8 is a diagram illustrating a data flow of the embodiments illustrated in FIG. 7.

FIG. 8 illustrates a data flow diagram 800 for making a VoIP based 933 telephone call according to embodiments of the present inventive concept illustrated in FIG. 7. This data flow may be representative of some or all of the operations executed by one or more logic, features, or devices described herein, such as any devices or systems described above with references to other figures herein. In the illustrated examples shown in FIG. 8, the data flow 800 may comprise one or more steps or processes involved in allocating and managing resources in a communications network as described elsewhere herein. The embodiments, however, are not limited to the number, type, order or arrangement of steps shown in FIG. 8.

As illustrated therein, the 933 test call is made by the caller 110 and routed through the customer telephony server 120 and the ES provider SBC 130 to the ES provider telephony server 140. The ES provider telephony server 140 obtains the call information from the ES provider database 150 and forwards the 933 test call and the "call info" to the alternate telephony server 510. The alternate telephony server 510 sends the call info to the audio generation server 320 and the audio generation server generates the customized audio response for the 933 test call. The alternate telephony server 510 receives the customized audio response from the audio generation server 320 and sends the customized audio response back to the caller 110.

Figure 9:
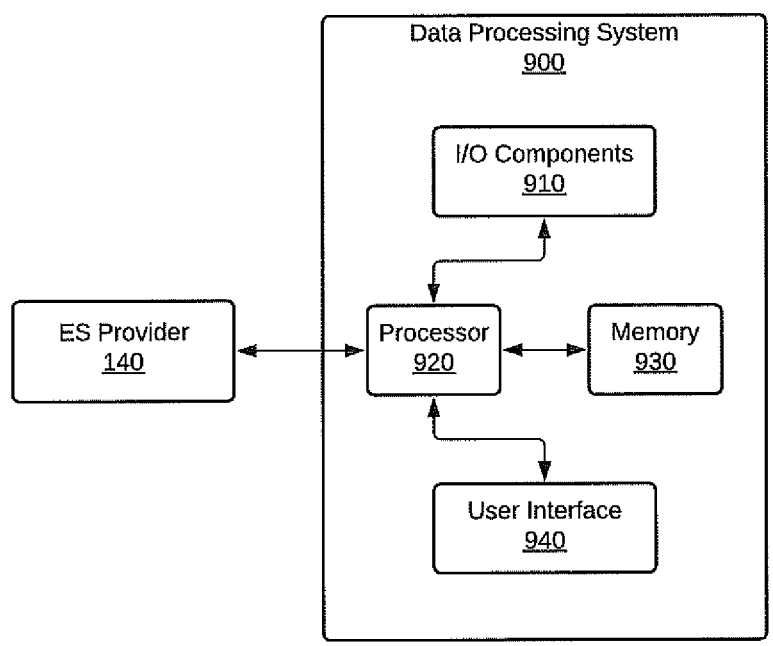
FIG. 9 is a block diagram illustrating an example of a computer based data processing system for use in accordance with some embodiments of the present inventive concept.

Referring now to FIG. 9, a block diagram of an example computer based data processing system 900 suitable for use with any of the embodiments discussed above will be discussed. Although the example data processing system 900 is shown as in communication with an ES provider 140 in accordance with embodiments of the present inventive concept, the data processing system 900 may also be part of the ES provider 140 without departing from the scope of the present inventive concept. In some embodiments, the data processing system 900 can be any suitable computing device for performing operations according to the embodiments discussed herein.

As illustrated, the data processing system 900 includes a processor 920 communicatively coupled to I/O components 910, a user interface 940 and a memory 930. The processor 920 can include one or more commercially available processors, embedded processors, secure processors, microprocessors, dual microprocessors, multi-core processors, other multi-processor architectures, another suitable processing device, or any combination of these. The memory 930, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 920.

I/O components 910 may be used to facilitate wired or wireless connections to devices such as one or more displays, game controllers, keyboards, mice, joysticks, cameras, buttons, speakers, microphones and/or other hardware used to input or output data. Memory 930 represents non-volatile storages such as magnetic, optical, or other storage media included in the data processing system and/or coupled to processor 920.

The user interface 940 may include, for example, a keyboard, keypad, touchpad, voice activation circuit, display or the like and the processor 920 may execute program code or instructions stored in memory 930.

It should be appreciated that data processing system 900 may also include additional processors, additional storage, and a computer-readable medium (not shown). The processor(s) 920 may execute additional computer-executable program instructions stored in memory 930. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As discussed briefly above, some embodiments of the present inventive concept provide techniques that allow a user to provide a customized audio response when a 933 test call is made. Some embodiments provide information out of band to conserve system usage. Use of embodiments discussed herein may increase customer satisfaction with 933 test call services.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flow-charts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

That which is claimed is:

1. A method of customizing an audio response to emergency test calls from a test call device, the method comprising:
    receiving a Voice over Internet Protocol (VoIP) emergency test call from a test call device by an emergency service (ES) provider;
    obtaining call information specific to the VoIP emergency test call from an ES provider customer database associated with the ES provider;
    providing the obtained call information specific to the VoIP emergency test call to an emergency test call audio generation server;
    generating a customized audio response to the VoIP emergency test call based on the provided information specific to the VoIP emergency test call using text-to-speech technology; and
    sending the customized audio response to the test call device,
    wherein providing the obtained call information specific to the VoIP emergency test call to an emergency test call audio generation server is preceded by:
    providing the obtained call information specific to the VoIP emergency test call to a customer hypertext transfer protocol (HTTP) server using out of band HTTP signaling separate from session initiation protocol (SIP) signaling associated with the VoIP emergency test call; and
    sending the call information specific to the VoIP emergency test call to the audio generation server from the customer HTTP server.

2. The method of claim 1, further comprising sending the generated customized audio response to a customer telephony server to communicate the customized audio response to the test call device.

3. The method of claim 1, wherein receiving the VoIP emergency test call is followed by providing the received VoIP emergency test call to an alternate telephony server, separate from a customer telephony server, the method further comprising:
    receiving the customized audio response at the alternate telephony server from the emergency test call audio generation server; and
    sending the customized audio response to the test call device from the alternate telephony server.

4. The method of claim 1, wherein the VoIP emergency test call is a 933 test call.

5. At least one non-transitory machine-readable medium comprising a set of instructions executable on at least one computing device to cause the at least one computing device to customize an audio response to emergency test calls, the set of instructions to:
    receive a Voice over Internet Protocol (VoIP) emergency test call from a test call device by an emergency service (ES) provider;
    obtain call information specific to the VoIP emergency test call from an ES provider customer database associated with the ES provider;
    provide the obtained call information specific to the VoIP emergency test call to an emergency test call audio generation server;
    generate a customized audio response to the VoIP emergency test call based on the provided call information specific to the VoIP emergency test call using text-to-speech technology;
    send the customized audio response to the test call device;
    provide the obtained call information specific to the VoIP emergency test call to a customer hypertext transfer protocol (HTTP) server separate from session initiation protocol (SIP) signaling associated with the VoIP emergency test call prior to providing the obtained call information specific to the VoIP emergency test call to an emergency test call audio generation server; and
    send the call information specific to the VoIP emergency test call to the audio generation server from the customer HTTP server.

6. The non-transitory machine-readable medium of claim 5, the set of instructions executable on the at least one computing device to further send the generated customized audio response to a customer telephony server to communicate the customized audio response to the test call device.

7. The non-transitory machine-readable medium of claim 5, the set of instructions executable on the at least one computing device to further:
provide the received VoIP emergency test call to an alternate telephony server, separate from a customer telephony server after receiving the VoIP emergency test call;
receive the customized audio response at the alternate telephony server from the emergency test call audio generation server; and
send the customized audio response to the test call device from the alternate telephony server.

8. The non-transitory machine-readable medium of claim 5, wherein the VoIP emergency test call is a 933 test call.

9. A computer for customizing an audio response to emergency test calls, comprising:
one or more processors; and
a non-transitory computer readable medium to store a set of instructions executable by the one or more processors, the set of instructions to cause the one or more processors to:
receive a Voice over Internet Protocol (VoIP) emergency test call from a test call device by an emergency service (ES) provider;
obtain call information specific to the VoIP emergency test call from an ES provider customer database associated with the ES provider;
provide the obtained call information specific to the VoIP emergency test call to an emergency test call audio generation server; and
generate a customized audio response to the VoIP emergency test call based on the provided call information specific to the VoIP emergency test call using text-to-speech technology;
send the customized audio response to the test call device;
provide the obtained call information specific to the VoIP emergency test call to a customer hypertext transfer protocol (HTTP) server separate from session initiation protocol (SIP) signaling associated with the VoIP emergency test call prior to providing the obtained call information specific to the VoIP emergency test call to an emergency test call audio generation server; and
send the call information specific to the VoIP emergency test call to the audio generation server from the customer HTTP server.

10. The computer of claim 9, the set of instructions to cause the one or more processors to send the generated customized audio response to a customer telephony server to communicate the customized audio response to the test call device.

11. The computer of claim 9, the set of instructions to cause the one or more processors to:
provide the received VoIP emergency test call to an alternate telephony server, separate from a customer telephony server after receiving the VoIP emergency test call;
receive the customized audio response at the alternate telephony server from the emergency test call audio generation server; and
send the customized audio response to the test call device from the alternate telephony server.

12. The computer of claim 9, wherein the VoIP emergency test call is a 933 test call.

* * * * *